United States Patent
Hsu et al.

(10) Patent No.: US 10,657,624 B2
(45) Date of Patent: May 19, 2020

(54) IMAGE SYNTHESIS METHOD FOR SYNTHESIZING IMAGES TAKEN BY CAMERAS ON OPPOSITE SIDES AND SMART DEVICE USING THE SAME

(71) Applicant: Acer Incorporated, New Taipei (TW)

(72) Inventors: Wen-Cheng Hsu, New Taipei (TW); Chao-Kuang Yang, New Taipei (TW); Hung-Chih Yu, New Taipei (TW); Tzu-Lung Chuang, New Taipei (TW)

(73) Assignee: Acer Incorporated, New Taipei (TW)

( * ) Notice: Subject to any disclaimer, the term of this patent is extended or adjusted under 35 U.S.C. 154(b) by 34 days.

(21) Appl. No.: 16/036,951

(22) Filed: Jul. 17, 2018

(65) Prior Publication Data

US 2019/0325559 A1 Oct. 24, 2019

(30) Foreign Application Priority Data

Apr. 20, 2018 (TW) .............................. 107113621 A

(51) Int. Cl.
*H04N 5/247* (2006.01)
*G06T 7/13* (2017.01)
*G06T 3/40* (2006.01)
*G06K 9/00* (2006.01)

(52) U.S. Cl.
CPC .............. *G06T 3/4038* (2013.01); *G06T 7/13* (2017.01); *H04N 5/247* (2013.01); *G06K 9/00221* (2013.01); *G06T 2207/20021* (2013.01); *G06T 2207/20221* (2013.01)

(58) Field of Classification Search
CPC ..................... G06T 3/4038; G06T 7/13; G06T 2207/20221; G06T 2207/20021; H04N 5/247; G06K 9/00221
See application file for complete search history.

(56) References Cited

U.S. PATENT DOCUMENTS

| | | | |
|---|---|---|---|
| 7,948,514 B2 | 5/2011 | Sato et al. | |
| 2012/0274808 A1* | 11/2012 | Chong | H04N 5/23293 348/234 |
| 2013/0044227 A1* | 2/2013 | Uehara | G02B 7/38 348/208.1 |
| 2014/0232743 A1* | 8/2014 | Na | G09G 5/377 345/629 |
| 2015/0009349 A1* | 1/2015 | Kim | H04N 5/2258 348/218.1 |

(Continued)

FOREIGN PATENT DOCUMENTS

| | | |
|---|---|---|
| CN | 105187709 | 12/2015 |
| TW | 201428679 | 7/2014 |

(Continued)

*Primary Examiner* — Hung H Lam
(74) *Attorney, Agent, or Firm* — JCIPRNET

(57) ABSTRACT

The disclosure provides an image synthesis method and a smart device using the same method. The method includes: respectively capturing a first image and a second image by using a first camera and a second camera, wherein the first camera and the second camera are disposed on opposite sides of the smart device; recognizing a first object in the first image; finding a specific area in the first image, wherein the specific area is not overlapped with the first object; embedding the second image into the specific area of the first image to generate a third image.

10 Claims, 10 Drawing Sheets

(56) References Cited

U.S. PATENT DOCUMENTS

2015/0262371 A1    9/2015  Harvill
2015/0304566 A1*  10/2015  Seo ................... H04N 5/23222
                                                         348/222.1
2017/0347040 A1   11/2017  Zhang et al.

FOREIGN PATENT DOCUMENTS

| TW | 201727515 | 8/2017 |
| TW | I616102   | 2/2018 |
| TW | I620147   | 4/2018 |

* cited by examiner

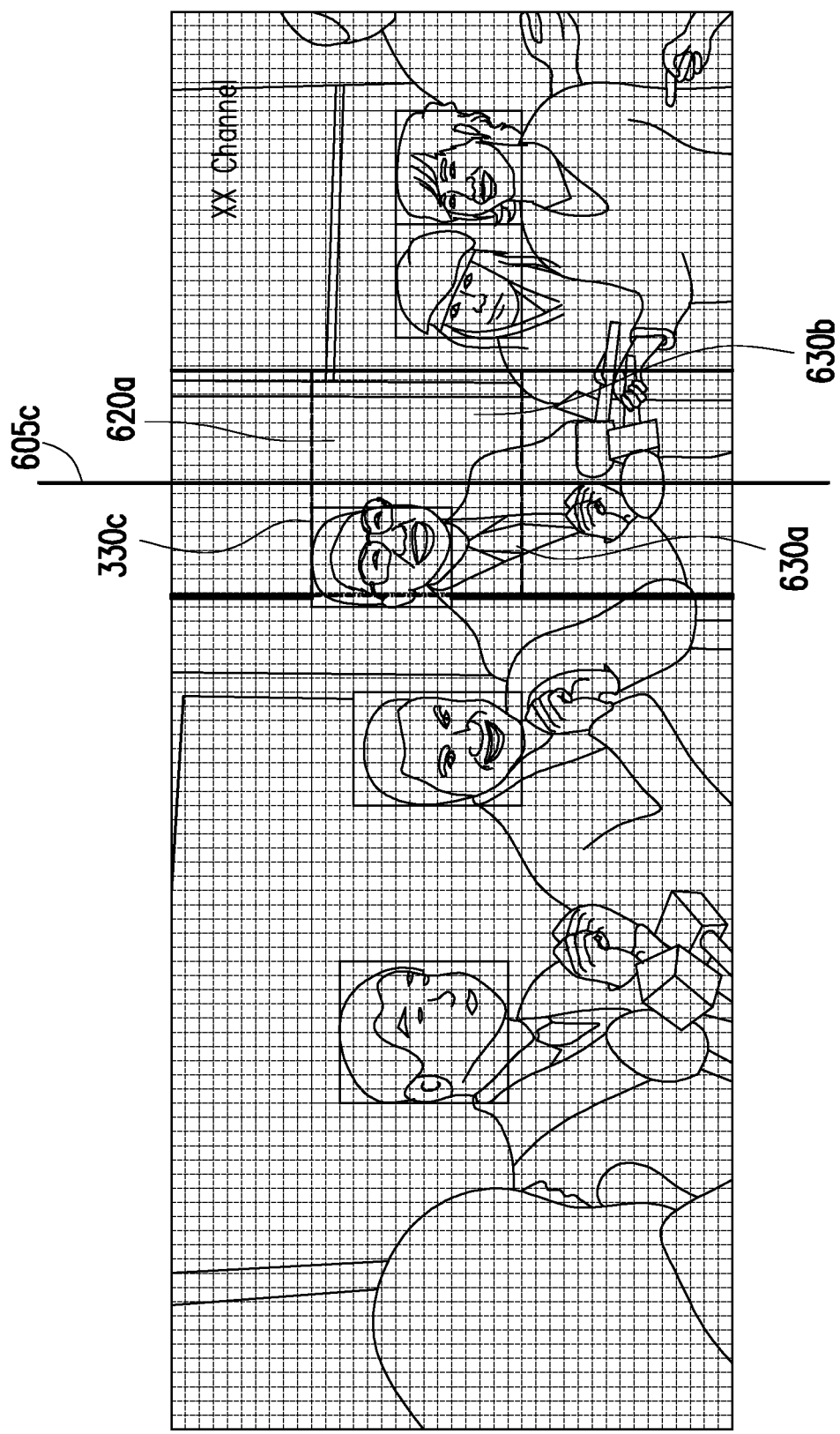

IMAGE SYNTHESIS METHOD FOR SYNTHESIZING IMAGES TAKEN BY CAMERAS ON OPPOSITE SIDES AND SMART DEVICE USING THE SAME

CROSS-REFERENCE TO RELATED APPLICATION

This application claims the priority benefit of Taiwan application serial no. 107113621, filed on Apr. 20, 2018. The entirety of the above-mentioned patent application is hereby incorporated by reference herein and made a part of this specification.

BACKGROUND OF THE INVENTION

Field of the Invention

The present disclosure relates to an image synthesis method and a smart device using the same, and more particularly, to an image synthesis method that synthesizes images taken by a front camera and a rear camera as well as a smart device using the method.

Description of Related Art

In modern society, smart devices equipped with cameras have become one of the most commonly used tools for taking photographs. However, similar to the use of a general camera, the taken photograph generally cannot include the photographer as well as the person being photographed at the same time, so there is always one member, who is responsible for taking the photograph, missing in the photograph taken.

In the prior art, there is a technical solution that allows a device to display a second preview image (such as an image of the photographer's head) obtained by the front camera of the device at a specific position of the first preview image (such as at a certain corner) at the same time when the rear camera of the device obtains a first preview image. Moreover, after the photographer presses the shutter, the device captures the entire current preview image to form a new image accordingly.

However, such approach does not place the second preview image in a more appropriate position based on the content of the first preview image, and it does not adaptively scale the size of the second preview image based on the content of the first preview image, such that it may cause poor effects on the newly generated image. For example, in the new image, the second preview image may block some important objects (such as a human face) in the first preview image. In addition, since the second preview image is likely to include the photographer's own face, which may be much larger than the face of the person being photographed as displayed in the first preview image, the proportion of the size of some certain people's faces as displayed in the new image may be too large.

Therefore, for persons skilled in the art, how to provide a better image synthesis method is indeed an important issue.

SUMMARY OF THE INVENTION

The disclosure provides an image synthesis method adapted for a smart device, comprising the following steps. A first image and a second image are respectively captured by using a first camera and a second camera, wherein the first camera and the second camera are disposed on two opposite sides of the smart device. At least one first object in the first image is recognized. A specific area is found in the first image, the specific area is not overlapped with the at least one first object, and the second image is embedded into the specific area of the first image to generate a third image.

The disclosure provides a smart device, comprising: a storage circuit, a first camera and a second camera. The first camera is disposed on a first side of the smart device. The second camera is disposed on a second side of the smart device, wherein the first side is opposite to the second side. A processor is coupled to the storage circuit, the first camera and the second camera and is adapted for accessing a plurality of modules for performing the following steps. The processor controls the first camera and the second camera to respectively capture a first image and a second image; recognizes at least one first object in the first image; finds a specific area in the first image, wherein the specific area is not overlapped with the at least one first object; and embeds the second image into the specific area of the first image to generate a third image.

Based on the above, in the image synthesis method and the smart device using the same provided by the disclosure, after a first image and a second image are respectively captured with a first camera and a second camera, a first object in the first image that cannot be blocked is recognized, and a second image is correspondingly embedded into a region of the first image not overlapped with the aforementioned first object. As such, a mechanism for automatically synthesizing the image of the photographer with the image of the person being photographed is provided, such that a better user experience is provided.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6A to FIG. 6D are schematic views of application scenarios according to FIG. 5.

DESCRIPTION OF THE EMBODIMENTS

Figure 1:
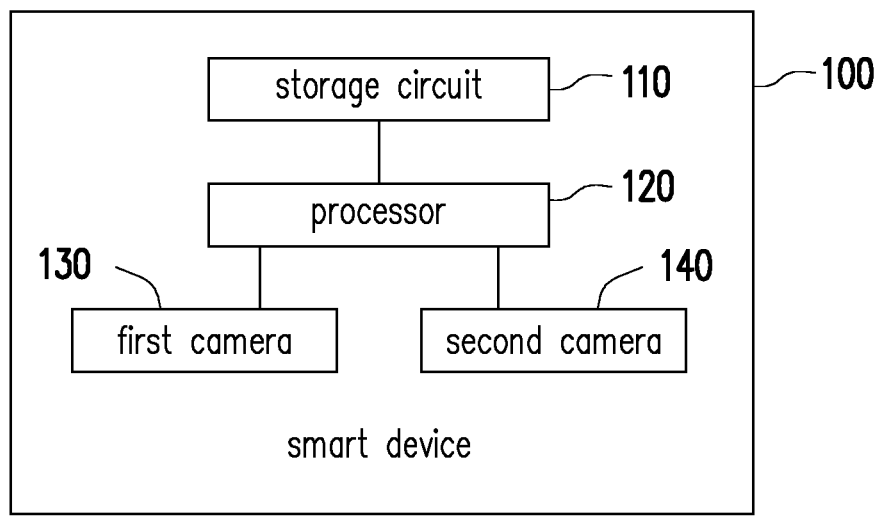
FIG. 1 is a schematic block diagram of a smart device according to an embodiment of the disclosure.

Referring to FIG. 1, FIG. 1 is a schematic block diagram of a smart device according to an embodiment of the disclosure. In this embodiment, a smart device 100 is, for example, a smart phone, a personal computer (PC), a notebook PC, a netbook PC or a tablet PC, but the disclosure is not limited thereto. As shown in FIG. 1, the smart device 100 includes a storage circuit 110, a processor 120, a first camera 130, and a second camera 140.

The storage circuit 110 is a memory, a hard drive, or any device used for storing data, for example, and is capable of recording a plurality of program codes or modules.

The first camera 130 and the second camera 140 may respectively be a charge coupled device (CCD) camera, a complementary metal oxide semiconductor transistors (CMOS) camera or other camera that may be used for capturing an image, but the disclosure is not limited thereto. Moreover, in the embodiments of the disclosure, the first camera 130 and the second camera 140 may be respectively located on a first side and a second side of the smart device 100, and the first side may be opposite to the second side. To facilitate the explanation, it will be assumed in the following embodiments that the first camera 130 and the second camera 140 are respectively a rear camera and a front camera of the smart device 100, but the disclosure is not limited thereto.

The processor 120 is coupled to the storage circuit 110, the first camera 130 and the second camera 140. The processor 120 may be a processor for general use, a processor for special use, a traditional processor, a digital signal processor, multiple microprocessors, one or multiple microprocessors combined with a digital signal processor core, a controller, a microcontroller, an application specific integrated circuit (ASIC), a field programmable gate array (FPGA) circuit, any other type of integrated circuit, a state machine, a processor based on an advanced RISC machine (ARM), or the like, for example.

In the embodiments of the disclosure, the processor 120 may access the modules in the storage circuit 110 for performing the image synthesis method provided by the disclosure, which will be described in detail below.

Figure 2:
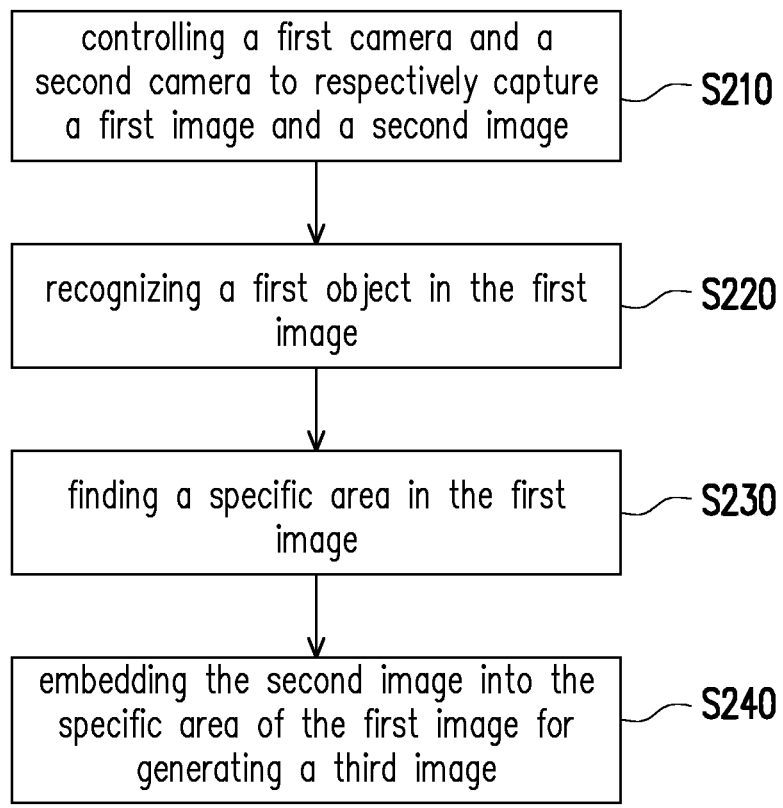
FIG. 2 illustrates an image synthesis method according to an embodiment of the disclosure.
Figure 3:
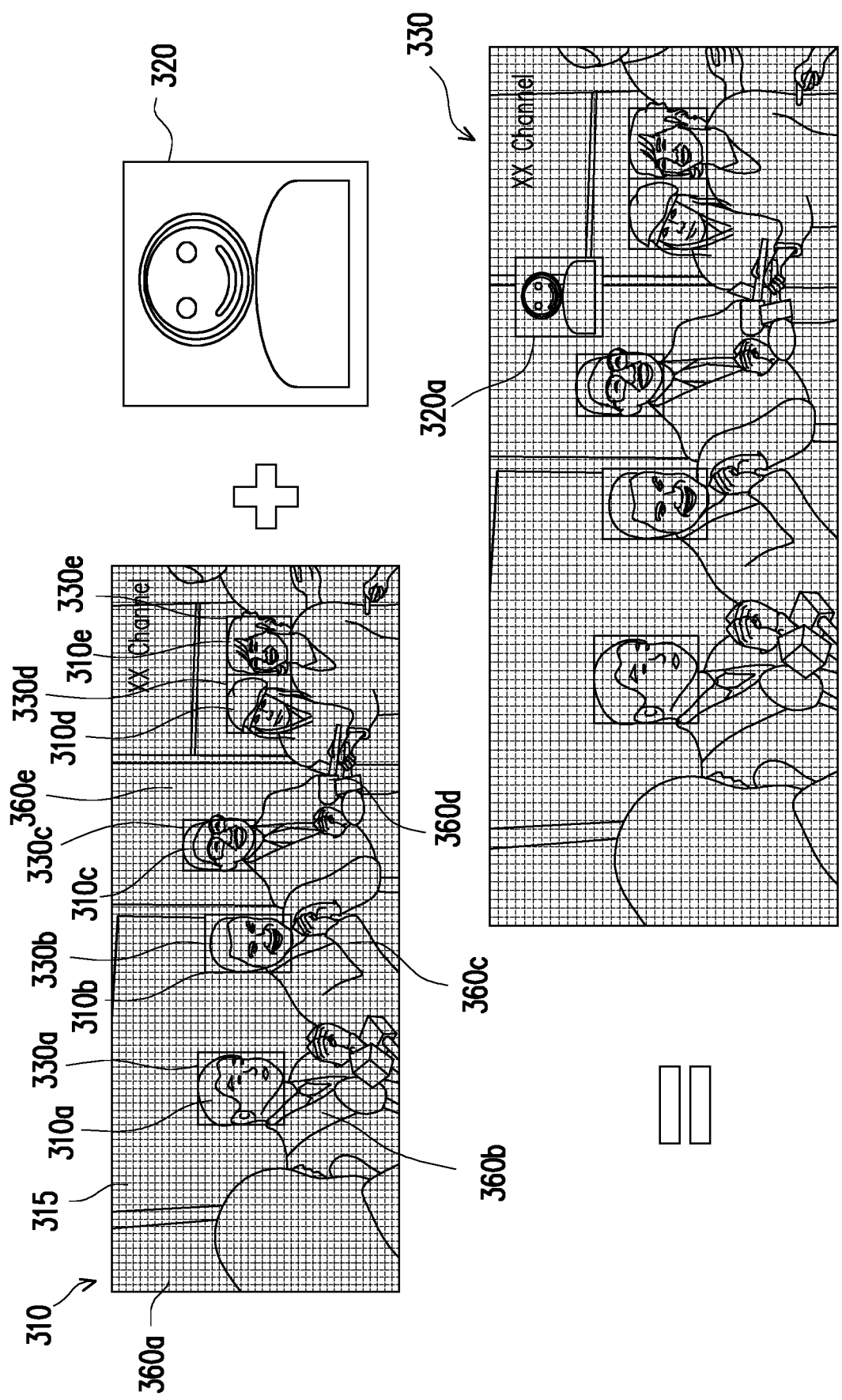
FIG. 3 is a schematic view of an application context according to an embodiment of the disclosure.

Referring to FIG. 2 and FIG. 3, FIG. 2 illustrates an image synthesis method according to an embodiment of the disclosure, and FIG. 3 is a schematic view of an application scenario according to an embodiment of the disclosure. The method shown in FIG. 2 may be implemented by the smart device 100 of FIG. 1. The details of each step of FIG. 2 will be described below with reference to the elements shown in FIG. 1 and the scenario shown in FIG. 3.

First, in step S210, the processor 120 controls the first camera 130 and the second camera 140 to respectively capture a first image 310 and a second image 320. According to the aforementioned assumption, the first image 310 is, for example, a picture captured by a photographer using the first camera 130 of the smart device 100, and the second image 320 is, for example, a selfie picture including the photographer's own face. It should be understood that, the second image 320 as illustrated is merely an example and is not for limiting possible embodiments of the disclosure. In other embodiments, the photographer may also let the second camera 140 only capture the photographer's face by adjusting the relative position between the smart device 100 and the photographer (i.e., the second image 320 only includes the photographer's face without including other body parts such as shoulders, neck, etc.), but the disclosure is not limited thereto.

In addition, in other embodiments, the first image 310 and the second image 320 may also be preview pictures captured respectively by the first camera 130 and the second camera 140, and the first image 310 and the second image 320 may be displayed on a display unit (such as a touch screen) of the smart device 100 for the user's view, but the disclosure is not limited thereto.

Then, in step S220, the processor 120 recognizes a plurality of first objects 310a, 310b, 310c, 310d, and 310e in the first image 310. In this embodiment, the processor 120 may, for example, perform a face recognition algorithm to find the first objects 310a, 310b, 310c, 310d, and 310e corresponding to the human faces in the first image 310. In an embodiment, the aforementioned face recognition algorithm is, for example, an artificial intelligence image recognition technology Lumos published by Facebook™ on the FBLearner Flow platform, but the disclosure is not limited thereto. In other embodiments, the processor 120 may also perform another recognition algorithm to find other specific objects, for example, faces of animals, but the disclosure is not limited thereto.

In step S230, the processor 120 finds a specific area in the first image, wherein the specific area is not overlapped with the first objects 310a, 310b, 310c, 310d and 310e. Specifically, as shown in FIG. 3, the processor 120 may first divide the first image 310 into a plurality of grids 315. In this embodiment, a size of each of the grids 315 is, for example, 5×5 (i.e., 5 pixels in length and width). Assuming that the size of the first image 310 is 500×200 (i.e. 500 pixels in length and 200 pixels in width), the first image 310 may be divided into grids 315 in a pattern of 100×40 (i.e., 100 grids in length and 40 grids in width) accordingly. In other embodiments, the first image 310 may also be divided into other patterns according to other principles, for example, be divided into grids in a pattern of 50×20 according to a grid whose size is 10×10 (i.e., 10 pixels in length and width), but the disclosure is not limited thereto.

Next, the processor 120 may find in the grids 315 the first grid sets 330a, 330b, 330c, 330d, and 330e respectively corresponding to the first objects 310a, 310b, 310c, 310d, and 310e.

In FIG. 3, the first grid set 330a may be characterized as grids 315 in a pattern of 10×12, the first grid set 330b may be characterized as grids 315 in a pattern of 8×12, the first grid set 330c may be characterized as grids 315 in a pattern of 7×10, and the first grid set 330d may be characterized as grids 315 in a pattern of 9×8, and the first grid set 330e may be characterized as grids 315 in a pattern of 9×8, but the disclosure is not limited thereto.

Then, the processor 120 may adjust the second image 320 to a second size according to a first size of each of the first grid sets 330a to 330e and characterize the second size as a second grid set 320a. In an embodiment, the second size is, for example, an average size of the first size of each of the first grid sets 330a to 330e.

Taking the aspect shown in FIG. 3 as an example, the average size of the first size of each of the first grid sets 330a to 330e is, for example, grids 315 of 8.6×10, and may also be approximated as grids 315 in a pattern of 9×10. In other words, the second grid set 320a corresponding to the adjusted second image 320 may be characterized as grids 315 in a pattern of 9×10.

In an embodiment, the processor 120 may also adjust the second image 320 to other sizes based on other principles. For example, the processor 120 may adjust the second image 320 based on an average size of only a part of the first grid sets 330a to 330e, but the disclosure is not limited thereto.

After obtaining the second grid set 320a, the processor 120 may find in the first image 310 a plurality of candidate regions 360a, 360b, 360c, 360d and 360e sufficient for accommodating the second grid set 320a, wherein the candidate regions 360a to 360e are not overlapped with the first grid sets 330a to 330e. Specifically, each of the candidate regions 360a to 360e is, for example, is a region having a size larger than the second grid set 320a, i.e. a region having a size larger than the grids 315 in a pattern of 9×10. but the disclosure is not limited thereto.

Then, the processor 120 may select one of the candidate regions 360a to 360e (for example, the candidate region 360e) as the specific area.

Referring to FIG. 2 again, in step S240, the processor 120 may subsequently embed the second image 320 into the specific area of the first image 310 to generate a third image 330. In this embodiment, the processor 120 may embed the adjusted second image 320 (i.e., the second grid set 320a) into the candidate region 360e to generate the third image 330.

In view of the above teachings, in addition to finding a suitable position not overlapping with a specific object (such as a human face) for placing the second image, the method proposed by the disclosure further adaptively adjusts the size of the second image such that the proportion of each object in the synthesized third image may be more consistent. As such, a better user experience may be provided.

In other embodiments, step S230 illustrated in FIG. 2 may be implemented in other manners to further improve the mechanism of embedding the second image into the first image. The details of the mechanism are described as follows.

Figure 4A:
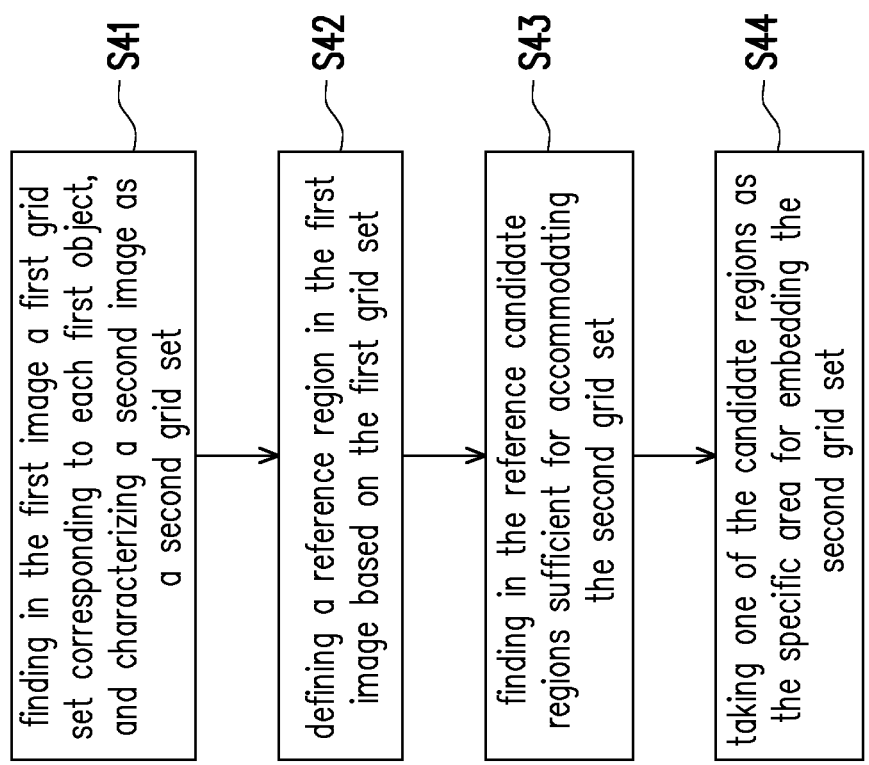
FIG. 4A illustrates one embodiment of step S230 of FIG. 2.
Figure 4B:
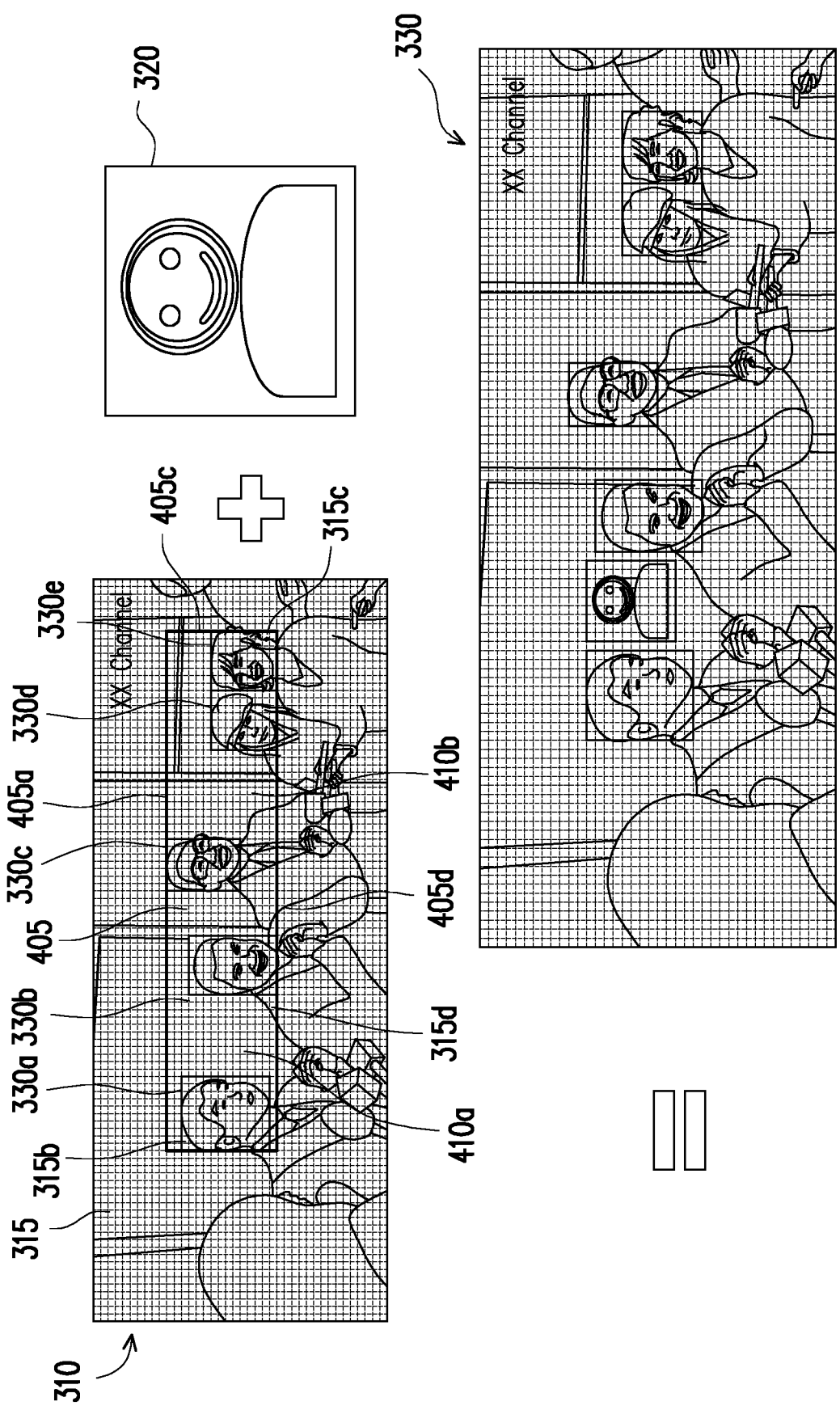
FIG. 4B is a schematic view of an application scenario according to FIG. 4A.

Referring to both FIG. 4A and FIG. 4B, FIG. 4A illustrates one embodiment of step S230 of FIG. 2, and FIG. 4B is a schematic view of an application scenario according to FIG. 4A. First, in step S41, the processor 120 may first find the first grid sets 330a to 330e corresponding to each of the first objects (not labelled additionally) in the first image 310 based on the teaching of the above embodiments and characterize the second image 320 as the second grid set 320a.

Next, in step S42, the processor 120 may define a reference region 405 in the first image 310 based on the first grid sets 330a to 330e. Specifically, the processor 120 may find a topmost grid 315a, a leftmost grid 315b, a rightmost grid 315c and a bottommost grid 315d from the first grid sets 330a to 330e, and respectively define a first edge 405a, a second edge 405b, a third edge 405c and a fourth edge 405d accordingly. Then, the processor 120 may take a region surrounded by the first edge 405a, the second edge 405b, the third edge 405c and the fourth edge 405d as the reference region 405.

In other embodiments, after the processor 120 obtains the first edge 405a, the second edge 405b, the third edge 405c and the fourth edge 405d, a reference region in other aspects slightly longer/shorter/wider/narrower than the reference region 405 may also be defined accordingly, but the disclosure is not limited thereto.

After the reference region 405 is obtained, in step S43, the processor 120 may find in the reference region 405 a plurality of candidate regions (which are not overlapped with each of the first grid sets 330a to 330e) sufficient for accommodating the second grid set 320a. Then, in step S44, the processor 120 may take one of the candidate regions as the specific area to be embedded into the second grid set 320a.

In this embodiment, it is assumed that there are candidate regions 410a and 410b existing in the reference region 405, and the candidate regions 410a and 410b are not overlapped with each of the first grid sets 330a to 330e and are sufficient for accommodating the second grid set 320a. In this case, the processor 120 may select one of the candidate regions 410a and 410b (for example, the candidate region 410a) to be embedded into the second grid set 320a, so as to generate the third image 430.

By embedding the second grid set 320a into the reference region 405, the second grid set 320a can be located closer to the first grid sets 330a to 330e, such that the synthesized third image 330 exhibits a better effect. In this example, the photographer's face may be placed closer to the face of the persons being photographed.

However, the candidate region 410b in FIG. 4 is obviously larger than the candidate region 410a, so if the second grid set 320a can be embedded into the candidate region 410b, the arrangement of human faces in the synthesized image should be less crowded, such that a better image effect may be provided. Therefore, the disclosure further proposes the following technical solutions that achieves the aforementioned effects by optimizing the implementation of step S43 in FIG. 4A. The details are specified as below.

Figure 5:
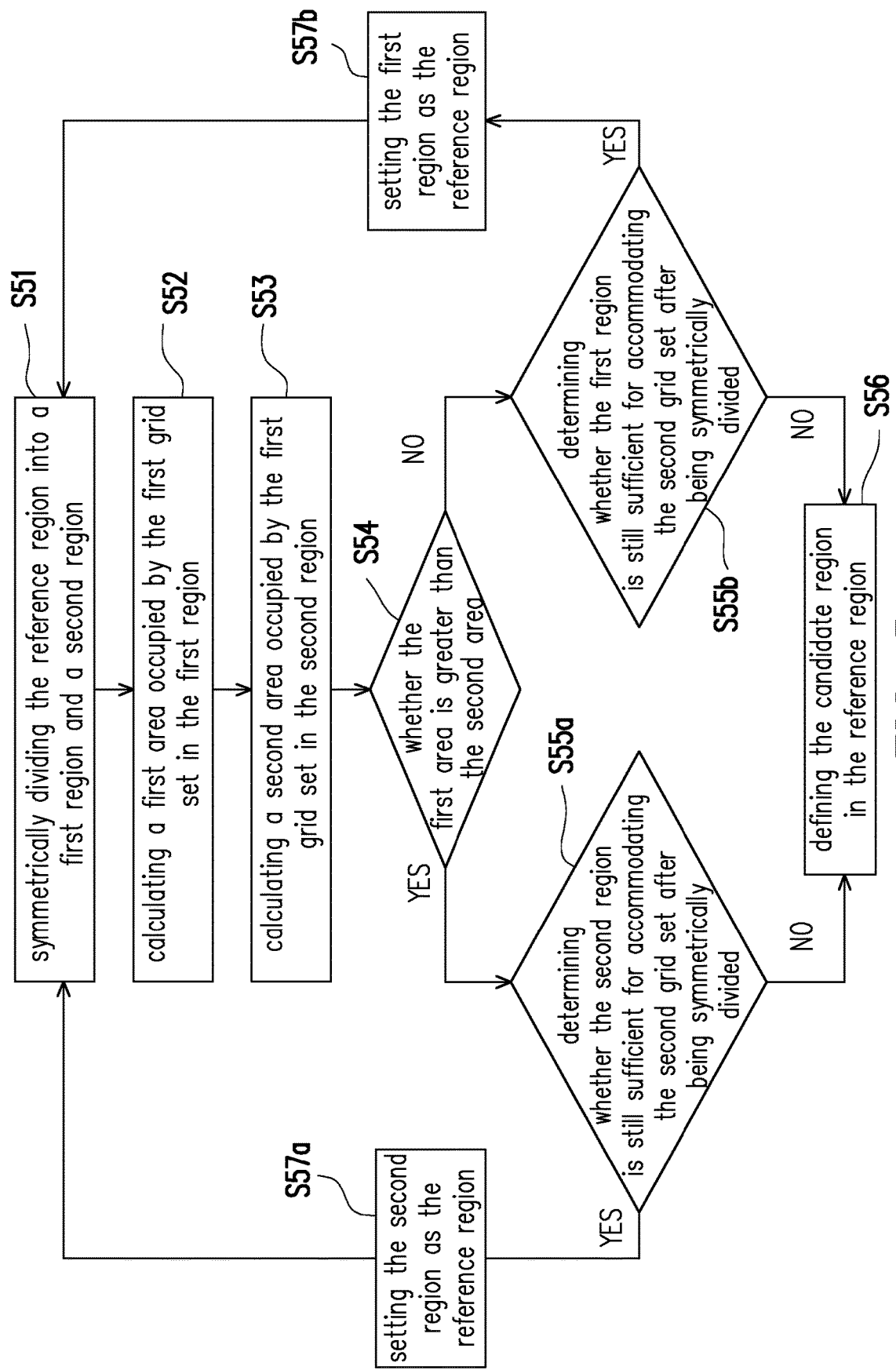
FIG. 5 illustrates one embodiment of step S43 of FIG. 4A.

FIG. 5 illustrates one embodiment of step S43 of FIG. 4A, and FIG. 6A to FIG. 6D are schematic views of application scenarios according to FIG. 5. In the following descriptions, the details of the steps of FIG. 5 will be explained sequentially with reference to FIG. 6A to FIG. 6D.

Figure 6A:
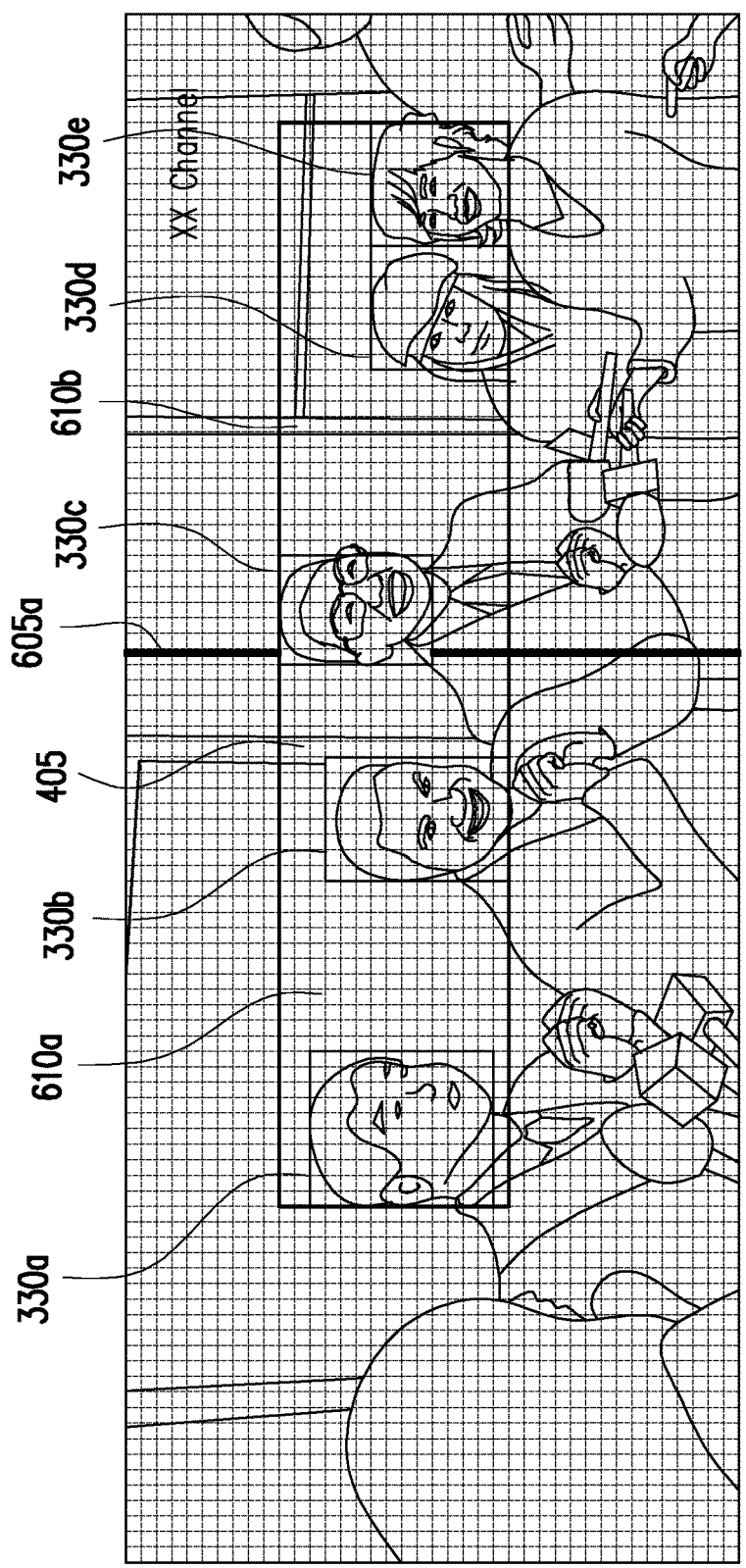

Referring to FIG. 6A, after the reference region 405 is obtained according to the teaching of the previous embodiment, in step S51, the processor 120 may symmetrically divide the reference region 405 into a first region 610a and a second region 610b. In this embodiment, the reference region 405 may be divided into the first region 610a and the second region 610b symmetrical to each other with respect to a demarcation 605a, but the disclosure is not limited thereto. In other embodiments, the processor 120 may determine the way of dividing the reference region 405 according to other principles, which will be described in the following.

Next, in step S52, the processor 120 may calculate a first area occupied by the first grid sets 330a to 330e in the first region 610a. In this embodiment, the first grid sets 330a to 330e respectively occupy the first region 610a with an area of the grids in a pattern of 10×12 (i.e., the entirety of the first grid set 330a) an area of the grids in a pattern of 8×12 (i.e., the entirety of the first grid set 330b) and an area of the grids in a pattern of 1×10 (i.e., the leftmost row of the first grid set 330c), so the first area is 226 (i.e., 10×12+8×12+1×10).

Similarly, in step S53, the processor 120 may calculate a second area occupied by the first grid sets 330a to 330e in the second region 610b. In this embodiment, the first grid sets 330a to 330e respectively occupy the second region 610b with an area of the grids in a pattern of 6×10 (i.e., the six rows of the first grid set 330c on the right) an area of the grids in a pattern of 9×8 (i.e., the entirety of the first grid set 330d) and an area of the grids in a pattern of 9×8 (i.e., the entirety of the first grid set 330e), so the second area is 204 (i.e., 6×10+9×8+9×8).

In step S54, the processor 120 may determine whether the first area is greater than the second area. In FIG. 6A, since the first area (i.e., 226) is larger than the second area (i.e., 204), it means that an area of the second region 610b not overlapped with the first grid sets 330a to 330e is larger, such that there is more sufficient space to place the second grid set 320a.

Therefore, the processor 120 may proceed to step S55a to determine whether the second region 610b is still sufficient for accommodating the second grid set 320a after being symmetrically divided. In the embodiment of FIG. 6A, a size of the second region 610b (i.e., 36×15) after being divided symmetrically is 18×15, the size is larger than the size of the second grid set 320a (i.e., 9×10). Therefore, the processor 120 may proceed to step S57a to set the second region 610b as the reference region is and returns to step S51.

Figure 6B:
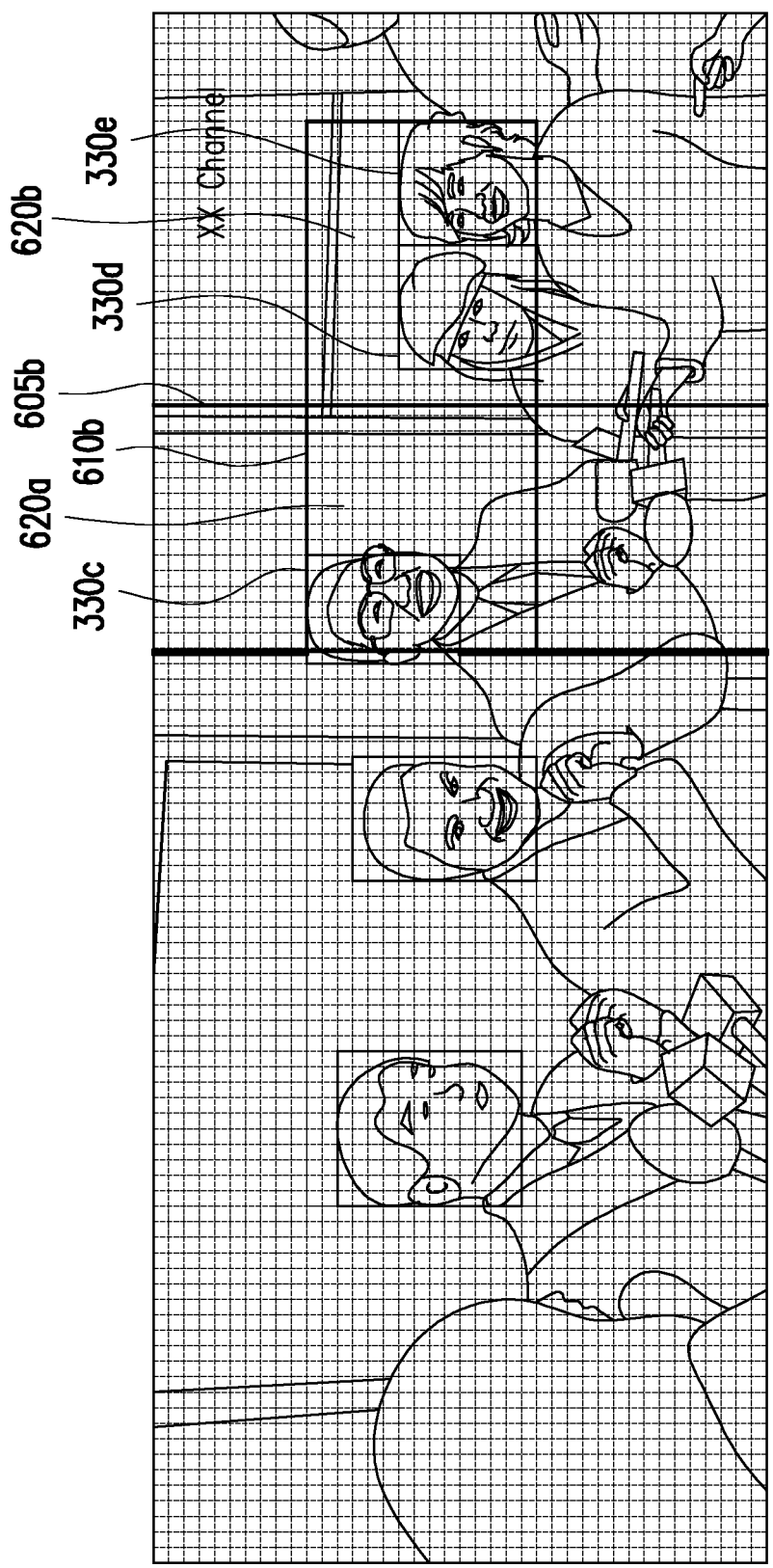

Continuing to refer to FIG. 6B, in FIG. 6B, the second region 610b is deemed as a new reference region, and the process shown in FIG. 5 is performed again.

In other words, in step S51, the processor 120 may symmetrically divide the second region 610b (i.e. the new reference region) into a first region 620a and a second region 620b. In this embodiment, the second region 610b may be divided into the first region 620a and the second region 620b symmetrical to each other with respect to a demarcation 605b.

Next, in step S52, the processor 120 may calculate a first area occupied by the first grid sets 330a to 330e in the first region 620a. In this embodiment, the first grid sets 330a to 330e occupy the first region 620a with an area of the grids in a pattern of 6×10 (i.e., the six rows of the first grid set 330c on the right), so the first area is 60 (i.e., 6×10).

Similarly, in step S53, the processor 120 may calculate a second area occupied by the first grid sets 330a to 330e in the second region 620b. In this embodiment, the first grid sets 330a to 330e respectively occupy the second region 620b with an area of the grids in a pattern of 9×8 (i.e., the entirety of the first grid set 330d) and an area of the grids in a pattern of 9×8 (i.e., the entirety of the first grid set 330e), so the second area is 144 (i.e., 9×8+9×8).

In step S54, the processor 120 may determine whether the first area is greater than the second area. In FIG. 6B, since the first area (i.e., 60) is not larger than the second area (i.e., 144), it means that an area of the second region 620a not overlapped with the first grid sets 330a to 330e is larger, such that the second region 620a has more sufficient space for placing the second grid set 320a.

Therefore, the processor 120 may proceed to step S55b to determine whether the first region 620a is still sufficient for accommodating the second grid set 320a after being symmetrically divided. In the embodiment of FIG. 6B, a size of the first region 620a (i.e., 18×15) after being divided symmetrically is 9×15, the size is larger than the size of the second grid set 320a (i.e., 9×10). Therefore, the processor 120 may proceed to step S57b to set the first region 620a as the reference region and returns to step S51.

Please continue to refer to FIG. 6C. In FIG. 6C, the process shown in FIG. 5 is to be performed again with the first region 620a serving as a new reference region.

In other words, in step S51, the processor 120 may symmetrically divide the first region 620a (i.e. the new reference region) into a first region 630a and a second region 630b. In this embodiment, the first region 620a may be divided into the first region 630a and the second region 630b symmetrical to each other with respect to a demarcation 605c.

Next, in step S52, the processor 120 may calculate a first area occupied by the first grid sets 330a to 330e in the first region 630a. In this embodiment, the first grid sets 330a to 330e occupy the first region 630a with an area of the grids in a pattern of 6×10 (i.e., the six rows of the first grid set 330c on the right), so the first area is 60 (i.e., 6×10).

Similarly, in step S53, the processor 120 may calculate a second area occupied by the first grid sets 330a to 330e in the second region 630b. In this embodiment, since the first grid sets 330a to 330e do not occupy any area in the second region 630b, the second area is 0.

In step S54, the processor 120 may determine whether the first area is greater than the second area. In FIG. 6C, since the first area (i.e., 60) is larger than the second area (i.e., 0), it means that an area of the second region 630b not overlapped with the first grid sets 330a to 330e is larger, such that the second region 630b has more sufficient space for placing the second grid set 320a.

Therefore, the processor 120 may proceed to step S55a to determine whether the second region 630b is still sufficient for accommodating the second grid set 320a after being symmetrically divided. In the embodiment of FIG. 6C, a size of the second region 630b (i.e., 9×15) after being divided symmetrically is 4.5×15, the size is smaller than the size of the second grid set 320a, so the second region 630b is not sufficient for accommodating the second grid set 320a. In this case, the processor 120 may proceed to step S56 to define a candidate region 640 in the reference region (i.e. the first region 620a).

Figure 6D:
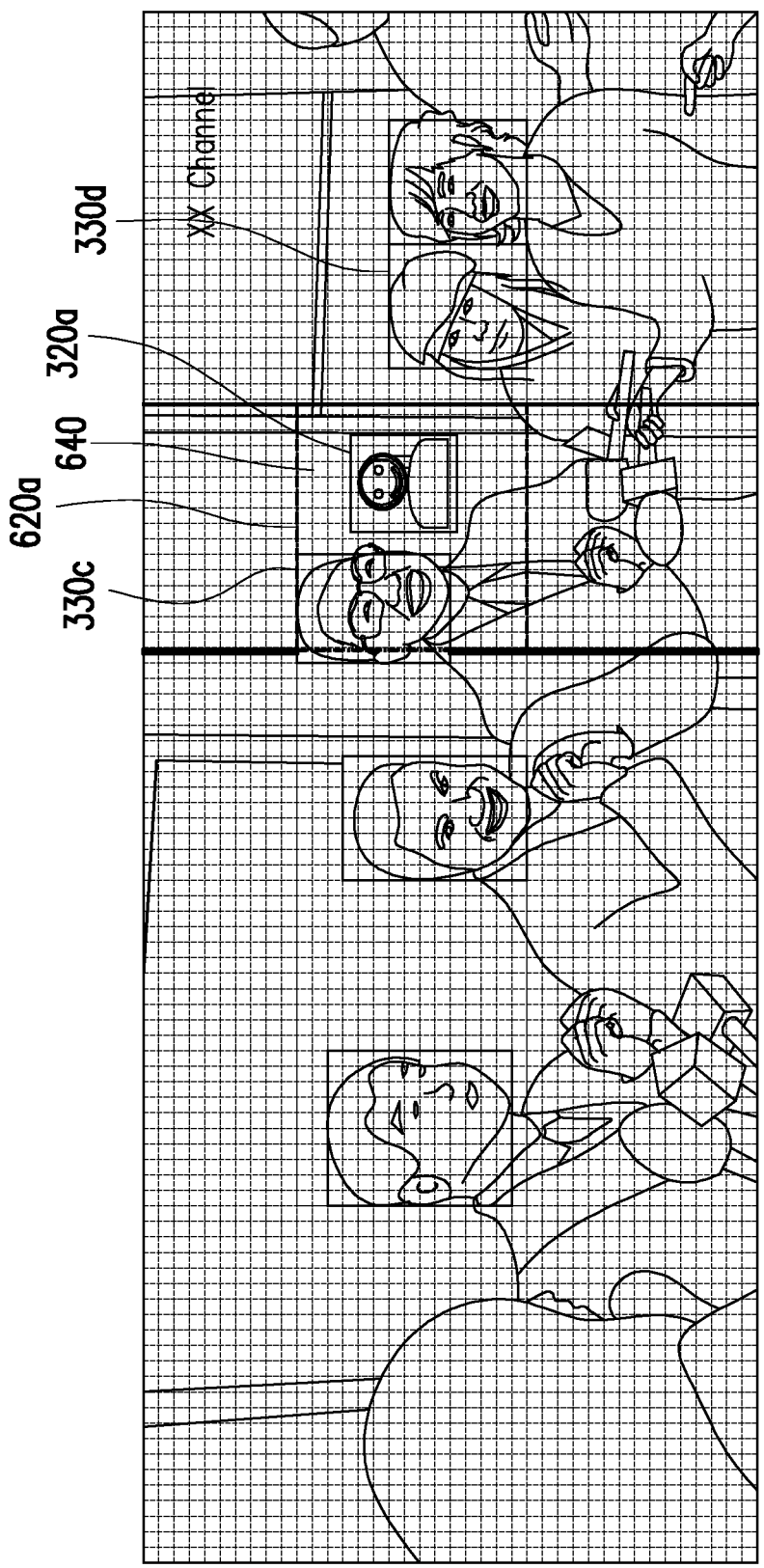

In FIG. 6D, the candidate region 640 is, for example, a 12×15 region on the right of the first region 620a, and the specific area adapted for embedding the second grid set 320a may be located, for example, in the center of the candidate region 640. Then, the processor 120 may embed the second grid set 320a into the specific area in the first image 310, so as to form the third image 330 as shown in FIG. 6D.

With the technical features taught as above, the position of the second image in the third image 330 being synthesized may be more matched with other first objects (for example, other human faces), and thereby providing better image effects and user experience.

In an embodiment, before the processor 120 actually embeds the second grid set 320a into the specific area, the processor 120 may further adjust the size of the second grid set 320a according to the sizes of the first grid sets located on both sides of the candidate region, so as to better coordinate the proportion of each object.

Taking FIG. 6D as an example, since the first grid sets 330c and 330d are located on both sides of the candidate region 640, the processor 120 may, for example, calculate an average size of the first grid sets 330c and 330d and then adjust the second grid set 320a to the aforementioned average size. Then, the processor 120 may embed the adjusted second grid set 320a into the candidate region 640. As such, the size of the second image 320 in the third image 330 is better matched to the first object on both sides of the candidate region 640, and the sense of inconsistency may be thereby reduced.

In other embodiments, the processor 120 may also perform the face recognition on the second image 320 in advance to obtain a human face therein (for example, the photographer's face), use the person's face as a new second image, and perform the technical features described in each of the aforementioned embodiments accordingly. The details are not described herein again.

In other embodiments, since the first object in the first image may be arranged in other aspects (for example, vertically stacked), the disclosure may determine, based on a certain mechanism, whether the reference region should be divided vertically to the first region and the second region symmetrical to each other, or the reference region should be divided horizontally to the first region and the second region symmetrical to each other, so as to synthesize a variety types of first images with the second image into a more appropriate third image.

To facilitate the explanation, it is assumed in the following that the first image is divided into grids in a pattern of M×N, and an average size of the first objects is A×B grids. In an embodiment, the processor 120 may calculate a first value and a second value, wherein the first value is, for example, M/A, and the second value is, for example, N/B.

If the first value is greater than the second value, the processor 120 may determine whether the first value is greater than A. If yes, the processor 120 may make the reference region be vertically divided into the first region and the second region symmetrical to each other; otherwise the processor 120 may make the reference region be horizontally divided into the first region and the second region symmetrical to each other.

On the other hand, if the first value is not greater than the second value, the processor 120 may determine whether the first value is greater than B. If yes, the processor 120 may make the reference region be horizontally divided into the first region and the second region symmetrical to each other; otherwise the processor 120 may make the reference region be vertically divided into the first region and the second region symmetrical to each other.

Taking FIG. 6A as an example, the first image 310 may be divided into grids in a pattern of 100×40 (i.e., M is 100 and N is 40), and the average size of the first objects 330a to 330e is grids in a pattern of 8.6×10 (i.e., A is 8.6 and B is 10). Accordingly, the processor 120 may calculate that the first value is 11.6279 (i.e., 100/8.6) and the second value is 4 (i.e., 40/10). Since the first value is greater than the second value, the processor 120 subsequently determines whether the first value (i.e. 11.6279) is greater than 8.6 (i.e. A). Since the first value is greater than 8.6, after defining the reference region 405, the processor 120 may correspondingly make the reference region 405 be vertically divided into the first region 610a and the second region 610b symmetrical to each other.

However, in other embodiments, if the first image is a vertical image, the processor 120 may determine, according to the steps taught above, that the reference region in the first image may be required to be horizontally divided into the first region and the second region symmetrical to each other, so as to better find the position suitable for placing the second image. The details are not described herein.

Figure 7:
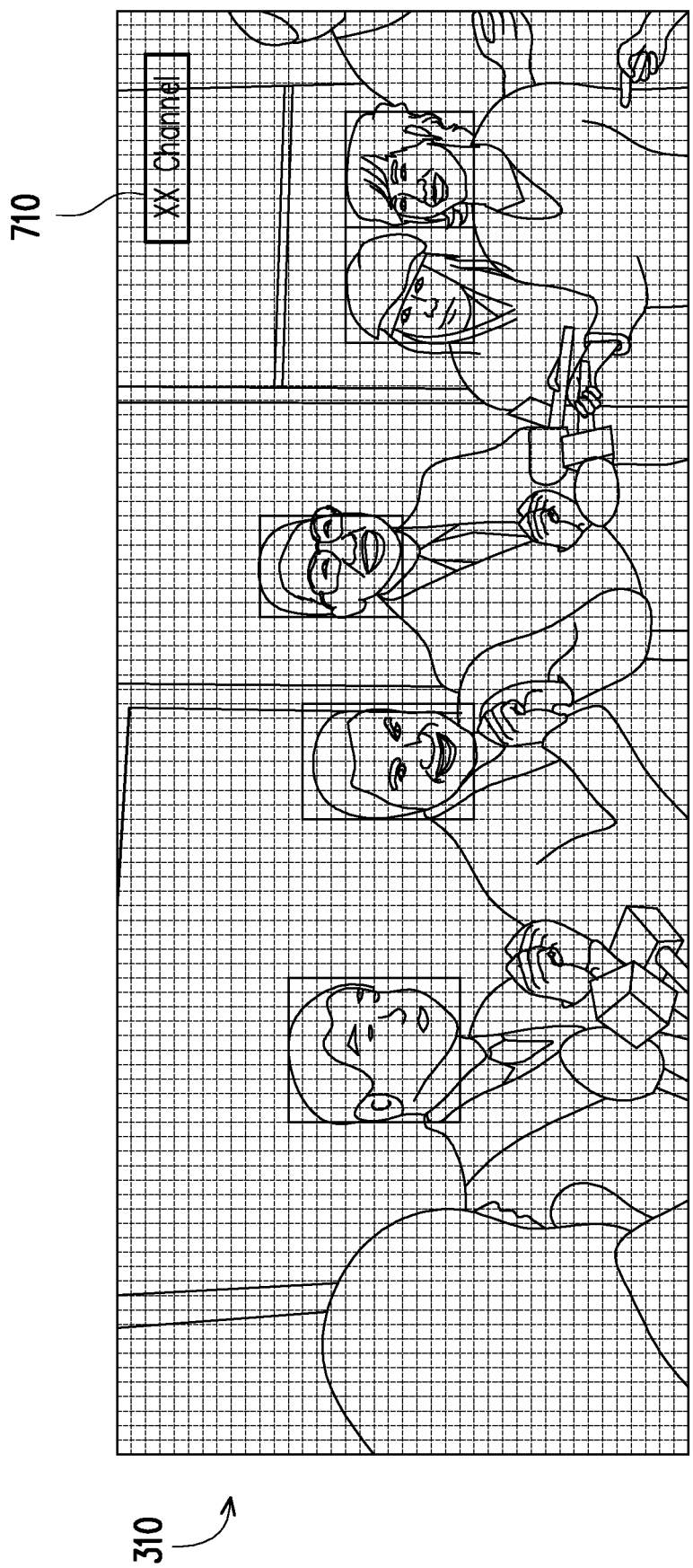
FIG. 7 is a schematic view of a first image according to an embodiment of the disclosure.

Referring to FIG. 7, FIG. 7 is a schematic view of a first image according to an embodiment of the disclosure. In this embodiment, if the first image 310 includes a disabled area 710 (such as a brand logo, a scoreboard or other objects that cannot be blocked), the processor 120 may make the specific area not overlapped with the disabled region. 710. As such, when the processor 120 embeds the second image into the first image in the following process, the disabled region 710 is not blocked and thus the important information in the first image 310 is not blocked as well.

In different embodiments, the disabled region may be selected from the first image by the user, or may be found by the processor 120 through some specific image recognition algorithms, but the disclosure is not limited thereto.

In sum of the above, the image synthesis method and the smart device using the same provided by the disclosure may, after a first image and a second image are respectively captured with a first camera (for example, the front camera) and a second camera (for example, the rear camera), a first object (such as a human face) in the first image that cannot be blocked is recognized, and then a second image is embedded into a region of the first image not overlapped with the aforementioned first object correspondingly. As such, a mechanism for automatically synthesizing the image of the photographer with the image of the person being photographed is provided, such that the user no longer feels regret for lacking the image of the photographer in the photograph taken.

In addition, in the embodiments of the disclosure, a position suitable for placing the second image is further found in the reference region defined by the first objects, and a mechanism for adjusting the size of the second image is also provided, such that the size/position of the human faces in the image is more matched and better image effects and user experience are provided.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An image synthesis method adapted for a smart device, comprising:
respectively capturing a first image and a second image by using a first camera and a second camera, wherein the first camera and the second camera are disposed on two opposite sides of the smart device;
recognizing at least one first object in the first image;
finding a specific area in the first image, wherein the specific area is not overlapped with the at least one first object, comprising:
dividing the first image into a plurality of grids;
finding from the plurality of grids at least one first grid set respectively corresponding to the at least one first object;
adjusting the second image to a second size according to a first size of each of the at least one first grid set and characterizing the second size as a second grid set;
finding in a first region at least one candidate region sufficient for accommodating the second grid set, wherein the at least one candidate region is not overlapped with the at least one first grid set; and
taking one of the at least one candidate region as the specific area; and
embedding the second image into the specific area of the first image for generating a third image.

2. An image synthesis method adapted for a smart device, comprising:
respectively capturing a first image and a second image by using a first camera and a second camera, wherein the first camera and the second camera are disposed on two opposite sides of the smart device;
recognizing at least one first object in the first image;
specific area in the first image the specific area is not overlapped with the at least one first object, comprising:
dividing the first image into a plurality of grids;
finding from the plurality of grids at least one first grid set respectively corresponding to the at least one first object;
adjusting the second image to a second size according to a first size of each of the at least one first grid set and characterizing the second size as a second grid set;
defining a reference region in the first image based on the at least one first grid set;
finding in the reference region at least one candidate region sufficient for accommodating the second grid set, wherein the at least one candidate region is not overlapped with the at least one first grid set; and
taking one of the at least one candidate region as the specific area; and
embedding the second image into the specific area of the first image for generating a third image.

3. The image synthesis method according to claim 2, wherein the step of defining the reference region in the first image based on the at least one first grid set comprises:
    finding a topmost grid, a leftmost grid, a rightmost grid and a bottommost grid from the at least one first grid set;
    defining a first edge, a second edge, a third edge and a fourth edge respectively based on the topmost grid, the leftmost grid, the rightmost grid and the bottommost grid; and
    taking a region surrounded by the first edge, the second edge, the third edge and the fourth edge as the reference region.

4. The image synthesis method according to claim 2, wherein the step of finding in the reference region the at least one candidate region sufficient for accommodating the second grid set comprises:
    (a) symmetrically dividing the reference region into a first region and a second region;
    (b) calculating a first area occupied by the at least one first grid set in the first region;
    (c) calculating a second area occupied by the at least one first grid set in the second region;
    (d) if the first area is greater than the second area, determining whether the second region is still sufficient for accommodating the second grid set after being symmetrically divided; and
        if not, defining the at least one candidate region in the reference region, wherein a size of each of the at least one candidate region corresponds to a size of the second grid set.

5. The image synthesis method according to claim 4, wherein if the second region is still sufficient for accommodating the second grid set after being symmetrically divided, the image synthesis method further comprises:
    setting the second region as the reference region and performing step (a) to step (d) again.

6. The image synthesis method according to claim 4, wherein the specific area is located in a center of the at least one candidate region.

7. The image synthesis method according to claim 4, wherein the reference region is vertically divided into the first region and the second region symmetrical to each other.

8. The image synthesis method according to claim 4, wherein the first image is divided into a plurality of grids in a pattern of M×N, an average size of the at least one first object is A×B grids, and before the step of symmetrically dividing the reference region into the first region and the second region, the image synthesis method further comprises:
    calculating a first value, wherein the first value is M/A;
    calculating a second value, wherein the second value is M/B;
    if the first value is greater than the second value, determining whether the first value is greater than A;
        if yes, making the reference region be vertically divided into the first region and the second region symmetrical to each other;
        if not, making the reference region be horizontally divided into the first region and the second region symmetrical to each other;
    if the first value is not greater than the second value, determining whether the second value is greater than B;
        if yes, making the reference region be horizontally divided into the first region and the second region symmetrical to each other; and
        if not, making the reference region be vertically divided into the first region and the second region symmetrical to each other.

9. The image synthesis method according to claim 2, wherein if the first image comprises a disabled area, the specific area is taken not overlapped with the disabled region.

10. A smart device, comprising:
    a storage circuit, storing a plurality of modules;
    a first camera, disposed on a first side of the smart device;
    a second camera, disposed on a second side of the smart device, wherein the first side is opposite to the second side;
    a processor, coupled to the storage circuit, the first camera and the second camera and adapted for accessing the plurality of modules for performing the following steps:
    controlling the first camera and the second camera to respectively capture a first image and a second image;
    recognizing at least one first object in the first image;
    finding a specific area in the first image, wherein the specific area not overlapped with the at least one first object, comprising:
        dividing the first image into a plurality of grids;
        finding from the plurality of grids at least one first grid set respectively corresponding to the at least one first object;
        adjusting the second image to a second size according to a first size of each of the at least one first grid set and characterizing the second size as a second grid set;
        finding in a first region at least one candidate region sufficient for accommodating the second grid set, wherein the at least one candidate region is not overlapped with the at least one first grid set; and
        taking one of the at least one candidate region as the specific area; and
    embedding the second image into the specific area of the first image for generating a third image.

* * * * *